United States Patent
Son et al.

(10) Patent No.: US 9,673,443 B2
(45) Date of Patent: *Jun. 6, 2017

(54) LITHIUM ELECTRODE AND LITHIUM SECONDARY BATTERY COMPRISING THE SAME

(71) Applicant: LG CHEM, LTD., Seoul (KR)

(72) Inventors: Byoung-Kuk Son, Daejeon (KR);
Min-Chul Jang, Daejeon (KR);
Min-Seo Kim, Daejeon (KR);
Da-Young Sung, Daejeon (KR);
Seong-Ho Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 28 days.

This patent is subject to a terminal disclaimer.

(21) Appl. No.: 14/440,539

(22) PCT Filed: Sep. 3, 2014

(86) PCT No.: PCT/KR2014/008271
§ 371 (c)(1),
(2) Date: May 4, 2015

(87) PCT Pub. No.: WO2015/037868
PCT Pub. Date: Mar. 19, 2015

(65) Prior Publication Data
US 2015/0280212 A1   Oct. 1, 2015

(30) Foreign Application Priority Data

Sep. 11, 2013 (KR) .................. 10-2013-0109366
Sep. 1, 2014 (KR) .................. 10-2014-0115490

(51) Int. Cl.
| | | |
|---|---|---|
| *H01M 4/131* | (2010.01) | |
| *H01M 10/0525* | (2010.01) | |
| *H01M 10/0567* | (2010.01) | |
| *H01M 10/0569* | (2010.01) | |
| *H01M 4/80* | (2006.01) | |
| *H01M 10/052* | (2010.01) | |
| *H01M 4/136* | (2010.01) | |
| *H01M 4/76* | (2006.01) | |
| *H01M 4/134* | (2010.01) | |
| *H01M 4/66* | (2006.01) | |
| *H01M 4/02* | (2006.01) | |
| *H01M 4/38* | (2006.01) | |

(52) U.S. Cl.
CPC ........... *H01M 4/131* (2013.01); *H01M 4/134* (2013.01); *H01M 4/136* (2013.01); *H01M 4/661* (2013.01); *H01M 4/762* (2013.01); *H01M 4/80* (2013.01); *H01M 10/052* (2013.01); *H01M 4/382* (2013.01); *H01M 10/0525* (2013.01); *H01M 10/0567* (2013.01); *H01M 10/0569* (2013.01); *H01M 2004/028* (2013.01); *H01M 2300/0025* (2013.01); *H01M 2300/0028* (2013.01); *Y02T 10/7011* (2013.01)

(58) Field of Classification Search
CPC .... H01M 4/80; H01M 10/4235; H01M 4/134; H01M 4/364; H01M 4/366; H01M 4/762; H01M 4/808; H01M 4/74; H01M 4/662; H01M 4/661; H01M 4/628; H01M 10/052; H01M 2300/0034; H01M 2300/0037; H01M 2220/30; H01M 2220/20; H01M 10/056
See application file for complete search history.

(56) References Cited

U.S. PATENT DOCUMENTS

| | | | |
|---|---|---|---|
| 2002/0150816 A1 | 10/2002 | Sakai et al. | |
| 2009/0305131 A1 | 12/2009 | Kumar et al. | |
| 2011/0041324 A1 | 2/2011 | Ando et al. | |
| 2012/0141882 A1 | 6/2012 | Ota et al. | |
| 2014/0272558 A1* | 9/2014 | Xiao ................ | H01M 10/28 429/211 |
| 2015/0017550 A1* | 1/2015 | Nishimura ........... | H01M 4/485 429/322 |

FOREIGN PATENT DOCUMENTS

| | | |
|---|---|---|
| CN | 1348230 A | 5/2002 |
| CN | 102437313 A | 5/2012 |
| CN | 102683639 A | 9/2012 |
| JP | H02-309558 A | 12/1990 |
| JP | H07-29596 A | 1/1995 |
| JP | 2011-249286 A | 12/2011 |
| JP | 2012-109164 A | 6/2012 |
| KR | 10-2004-0096381 A | 11/2004 |
| KR | 10-2005-0002708 A | 1/2005 |
| KR | 10-2012-0111508 A | 10/2012 |
| TW | 200505082 A | 2/2005 |
| WO | WO 02/061863 A1 | 8/2002 |

OTHER PUBLICATIONS

International Search Report, issued in PCT/KR2014/0008271, mailed Jan. 14, 2015.

* cited by examiner

*Primary Examiner* — Muhammad Siddiquee
(74) *Attorney, Agent, or Firm* — Birch, Stewart, Kolasch & Birch, LLP

(57) ABSTRACT

The present disclosure relates to a lithium electrode, comprising a porous metallic current collector; and lithium metal inserted into pores present in the metallic current collector. The lithium electrode according to the present disclosure can increase contact surface between lithium metal and a current collector to improve the performances of a lithium secondary battery, and can exhibit uniform electron distribution therein to prevent the growth of lithium dendrites during the operation of a lithium secondary battery, thereby improving the safety of a lithium secondary battery.

12 Claims, 2 Drawing Sheets

LITHIUM ELECTRODE AND LITHIUM SECONDARY BATTERY COMPRISING THE SAME

TECHNICAL FIELD

The present disclosure relates to a lithium electrode and a lithium secondary battery comprising the same, more specifically a lithium electrode that can prevent lithium dendrites from being grown during the operation of a lithium secondary battery, and a lithium secondary battery comprising the same.

This application claims priority from Korean Patent Application No. 10-2013-0109366 filed in the Republic of Korea on Sep. 11, 2013 and Korean Patent Application No. 10-2014-0115490 filed in the Republic of Korea on Sep. 1, 2014, which are incorporated herein by reference.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them.

In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries.

Generally, secondary batteries are constructed by embedding an electrode assembly consisting of an anode, a cathode, and a separator interposed therebetween in the form of a laminated or wound structure in a battery case and introducing a non-aqueous electrolyte solution therein.

As the anode, a lithium electrode has often been used, the lithium electrode being generally formed by attaching a lithium foil on a planar current collector.

FIG. 1 shows electron transfer paths in a conventional lithium electrode prepared by attaching a lithium foil on a planar current collector.

Referring to FIG. 1, while a battery having the conventional lithium electrode 10 operates, electrons transfer through a current collector 11 into a lithium foil 12 to make a unidirectional flow. From this, electron density on lithium surface becomes un-uniform, and thus lithium dendrites may be formed.

These lithium dendrites may cause damage on the separator and a short circuit in the lithium secondary battery, thereby deteriorating the safety of the battery.

DISCLOSURE

Technical Problem

The present disclosure is designed to solve the problems of the prior art, and therefore it is an object of the present disclosure to provide a lithium electrode that can increase contact surface between lithium metal and a current collector and allow uniform electron distribution in the lithium electrode to prevent the growth of lithium dendrites during the operation of a lithium secondary battery.

Technical Solution

In order to accomplish the above object, in accordance with one aspect of the present disclosure, there is provided a lithium electrode, comprising a porous metallic current collector; and lithium metal inserted into pores present in the metallic current collector.

The lithium metal may be inserted in an amount of 1 to 50 wt % based on the total weight of the lithium electrode.

The metallic current collector may be made of any one selected from the group consisting of copper, nickel, iron, chromium, zinc, stainless steel and a mixture thereof.

The metallic current collector may have a porosity of 50 to 99%.

The pores may have a size of 5 to 500 μm.

The metallic current collector may be in the form of metal mesh or metal foam.

In accordance with another aspect of the present disclosure, there is provided a lithium secondary battery, comprising an electrode assembly comprising a cathode, an anode, and a separator interposed therebetween; a battery case for receiving the electrode assembly; and a non-aqueous electrolyte solution being introduced in the battery case to be impregnated into the electrode assembly, wherein the anode is the above-mentioned lithium electrode of the present disclosure.

The cathode may comprise a cathode active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

The separator may be a porous substrate made of any one selected from the group consisting of polyethylene, polypropylene, polybutylene, polypentene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate and a mixture thereof.

Also, the non-aqueous electrolyte solution may comprise an organic solvent and an electrolyte salt.

The organic solvent may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, fluoroethylene carbonate (FEC), dimethyl carbonate (DMC), diethyl carbonate (DEC), dipropyl carbonate, ethyl methyl carbonate (EMC), methyl propyl carbonate, ethyl propyl carbonate, dimethyl ether, diethyl ether, dipropyl ether, methyl ethyl ether, methyl propyl ether, ethyl propyl ether, methyl acetate, ethyl acetate, propyl acetate, methyl propionate, ethyl propionate, propyl propionate, γ-butyrolactone, γ-valerolactone, γ-caprolactone, σ-valerolactone, ε-caprolactone and a mixture thereof.

Also, the electrolyte salt may comprise an anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2$ $CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The battery case may be cylindrical, prismatic, pouch, or coin forms.

Advantageous Effects

The lithium electrode according to the present disclosure can increase contact surface between lithium metal and a current collector to improve the performances of a lithium secondary battery.

Also, the lithium electrode can exhibit uniform electron distribution therein to prevent the growth of lithium dendrites during the operation of a lithium secondary battery, thereby improving the safety of a lithium secondary battery.

DESCRIPTION OF DRAWINGS

The accompanying drawing illustrates a preferred embodiment of the present disclosure and, together with the foregoing disclosure, serves to provide further understanding of the technical spirit of the present disclosure. However, the present disclosure is not to be construed as being limited to the drawings.

Figure 1:
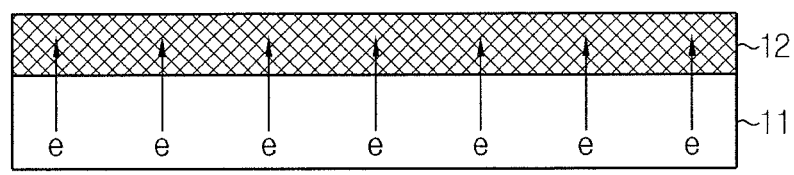
FIG. 1 shows electron transfer paths in a conventional lithium electrode prepared by attaching a lithium foil on a planar current collector.

EXPLANATION OF REFERENCE NUMERALS 10, 100: Lithium Electrode
11: Current Collector
12: Lithium Foil
110: Porous Metallic Current Collector
120: Lithium Metal

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the configurations illustrated in the drawings and the embodiments are just preferable examples for the purpose of illustrations only, not intended to limit the scope of the disclosure, so it should be understood that other equivalents and modifications could be made thereto without departing from the spirit and scope of the disclosure.

Figure 2:
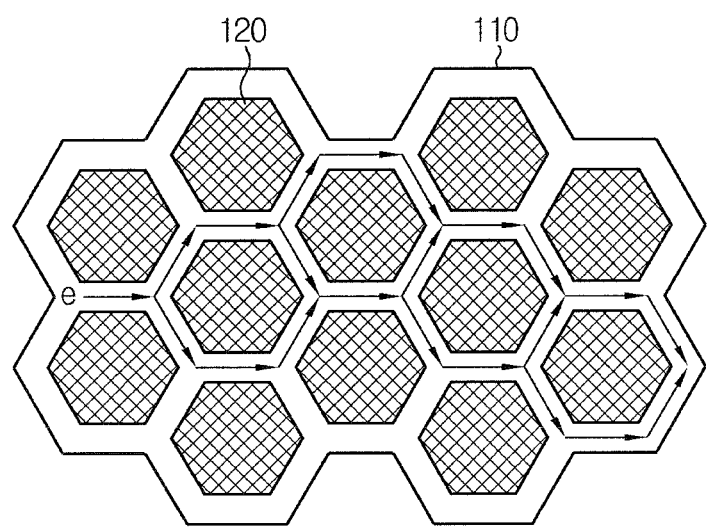
FIG. 2 shows electron transfer paths in a lithium electrode prepared according to one embodiment of the present disclosure.
Figure 3:
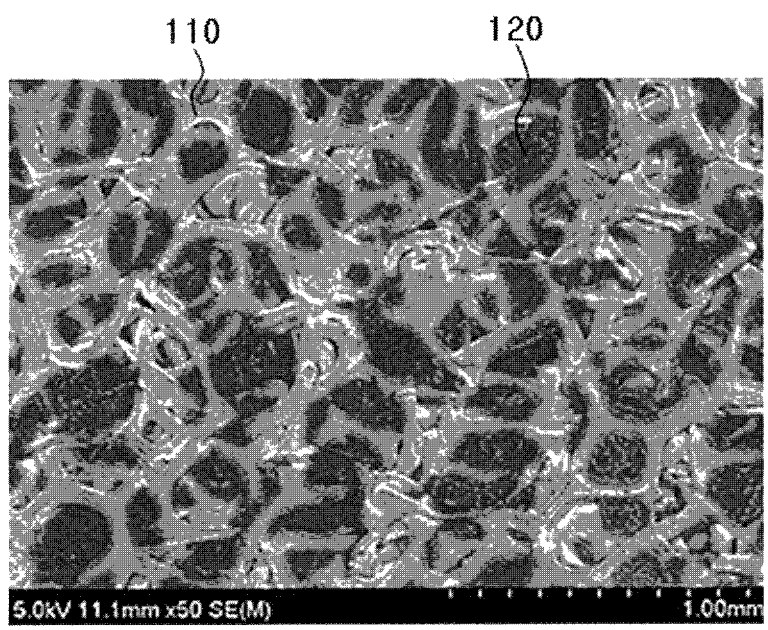
FIG. 3 is an SEM photograph showing the surface of a lithium electrode prepared according to one embodiment of the present disclosure.

FIG. 2 shows electron transfer paths in a lithium electrode prepared according to one embodiment of the present disclosure, and FIG. 3 is an SEM photograph showing the surface of a lithium electrode prepared according to one embodiment of the present disclosure.

Referring to FIGS. 2 and 3, the lithium electrode 100 according to one aspect of the present disclosure comprises a porous metallic current collector 110; and lithium metal 120 inserted into pores present in the metallic current collector 110.

In order to insert the lithium metal into pores present in the porous metallic current collector, a lithium foil is put on the porous metallic current collector 110, followed by roll pressing to insert the lithium foil into the pores, or the lithium foil is melted and then introduced in the pores. Also, metallic powders forming the metallic current collector and lithium metal powders are mixed with each other to obtain a slurry and the slurry is coated on a substrate by way of comma coating, bar coating or slot-die coating methods, thereby preparing the lithium electrode 100 of the present disclosure.

A conventional lithium electrode has been prepared by attaching a lithium foil on a planar current collector. In this case, while a battery having such a lithium electrode operates, electrons transfer through the planar current collector into the lithium foil to make a unidirectional flow, thereby forming lithium dendrites. These lithium dendrites may cause damage on the separator and a short circuit in the lithium secondary battery, thereby deteriorating the safety of the battery.

The lithium electrode of the present disclosure has the structure that the lithium metal is inserted into pores of the porous metallic current collector 110, and such a structure can increase contact surface between lithium acting as an electrode active material and the current collector to allow electrons to be uniformly distributed on the surface of lithium. This can improve the performances of a lithium secondary battery, and can prevent the growth of lithium dendrites to improve the safety of the lithium secondary battery.

In the present disclosure, the lithium metal 120 may be present in an amount of 1 to 50 wt %, preferably 3 to 30 wt %, more preferably 5 to 20 wt %, based on the total weight of the lithium electrode 120. When such content range is satisfied, the growth of lithium dendrites can be prevented even though the charging and discharging processes continue over 100 cycles, thereby inhibiting the occurrence of a short circuit. Meanwhile, if the content of the lithium metal 120 is less than 1 wt %, it is difficult to function as a lithium electrode, and if the content of the lithium metal 120 is more than 50 wt %, the lithium metal 120 may fill the whole pores of the porous metallic current collector 110, making it difficult to obtain the effect of using the porous metallic current collector 110.

In the present disclosure, the metallic current collector 110 may be made of any one selected from the group consisting of copper, nickel, iron, chromium, zinc, stainless steel and a mixture thereof, but is not limited if it is made of a metal being stable in voltage regions to be used.

Also, when the metallic current collector 110 has the higher porosity and the smaller size, the better effect of preventing the growth of lithium dendrites can be obtained. In the present disclosure, the metallic current collector 110 may have a porosity of 50 to 99%, and pores formed in the metallic current collector 110 may have a size of 5 to 500 µm. Thereby, the growth of lithium dendrites can be prevented even though the charging and discharging processes continue over 100 cycles, and thus the occurrence of a short circuit can be inhibited.

The metallic current collector 110 may be in the form of metal mesh or metal foam.

Meanwhile, in accordance with another aspect of the present disclosure, there is provided a lithium secondary battery, comprising an electrode assembly comprising a cathode, an anode, and a separator interposed therebetween; a battery case for receiving the electrode assembly; and a non-aqueous electrolyte solution being introduced in the battery case to be impregnated into the electrode assembly, wherein the anode is the above-mentioned lithium electrode of the present disclosure.

The cathode comprises a cathode current collector and a cathode active material layer formed on one or both surfaces of the cathode current collector. Non-limiting examples of the cathode current collector include foils made of aluminum nickel or a combination thereof. The cathode active material layer may comprise a cathode active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

The cathode active material layer may further comprise a conductive material to improve electrical conductivity. The conductive material is not particularly limited if it is an electrically conductive material which does not cause chemical change in an electrochemical device. As the conductive material, carbon black, graphite, carbon fiber, carbon nanotube, metal powders, and conductive metal oxides may be generally used, and examples of a commercially available conductive material include acetylene black series (Chevron Chemical Company or Gulf Oil Company), Ketjen Black EC series (Armak Company), Vulcan, XC-72 (Cabot Company) and Super P (MMM Carbon Company). Particularly, acetylene black, carbon black, graphite and the like may be mentioned.

Also, as a binder that can retain the cathode active materials in the cathode current collector and can act as a connector between the active materials, various kinds of binders, for example, polyvinylidene fluoride-co-hexafluoro propylene (PVDF-co-HFP), polyvinylidene fluoride (PVDF), polyacrylonitrile, polymethyl methacrylate, styrene-butadiene rubber (SBR), carboxyl methyl cellulose (CMC) and the like may be used.

Meanwhile, the separator which may be used in the present disclosure includes any one which has been conventionally used in the art, for example, porous membranes or non-woven fabrics made of a polyolefin-based polymer, but is not limited thereto.

The polyolefin-based porous membranes may be obtained from a polymer selected from polyethylenes such as a high-density polyethylene, a linear low-density polyethylene, a low-density polyethylene and an ultra-high molecular weight polyethylene, polypropylene, polybutylene, polypentene, and a mixture thereof.

The non-woven fabric may be a polyolefin-based non-woven fabric, or a non-woven fabric made of a polymer selected from polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate and a mixture thereof. The non-woven fabric may be a spun-bond or melt-blown fabric consisting of a long fiber in structure.

The porous substrate may have a thickness of 1 to 100 μm, preferably 5 to 50 μm, but is not particularly limited thereto.

Also, the porous substrate may have a pore size of 0.01 to 50 μm and a porosity of 10 to 95%, but is not particularly limited thereto.

Meanwhile, the non-aqueous electrolyte solution used in the present disclosure comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The non-aqueous electrolyte solution used in the present disclosure comprises an organic solvent which is conventionally used in an electrolyte solution for a lithium secondary battery, for example, ethers, esters, amides, linear carbonates, cyclic carbonates, and a mixture thereof.

Among these, a linear carbonate, a cyclic carbonate, or a mixture thereof is representatively used.

The cyclic carbonate may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof. Examples of the halide include fluoroethylene carbonate (FEC) and the like, but are not limited thereto.

The linear carbonate may be selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

The introduction of the non-aqueous electrolyte may be carried out in any suitable step during the manufacturing of the electrochemical device depending on the manufacturing processes and desired physical properties of a final product. Specifically, the electrolyte may be introduced before assembling a battery or in the final step of the assembling.

Also, the lithium secondary battery of the present disclosure may be prepared by stack (lamination), folding, and stack/folding of a separator and electrodes, as well as a conventional winding process. In addition, the battery case may be cylindrical, prismatic, pouch, or coin forms.

Hereinafter, the present disclosure will be described in detail through specific examples. However, the description proposed herein is just a preferable example for the purpose of illustrations only, not intended to limit the scope of the invention, so it should be understood that the examples are provided for a better explanation to an ordinary person skilled in the art.

1.. EXAMPLE 1

(1) Preparation of Cathode

LiCoO$_2$ as a cathode active material, super P as a conductive material, polyvinylidene fluoride (PVDF) were mixed in an amount of 95 wt %, 2.5 wt % and 2.5 wt %, respectively, to obtain a slurry of cathode active material, and the slurry was coated on an aluminum current collector, followed by drying, to prepare a cathode.

(2) Preparation of Anode

A lithium foil was put on a current collector being a copper foam form and having an average pore size of 400 μm and a porosity of 90%, and the lithium foil was inserted into pores of the copper foam by roll pressing to prepare an anode. At this time, the amount of lithium was 5 wt % based on the total weight of the anode.

(3) Preparation of Lithium Secondary Battery

A propylene-based porous membrane was interposed between the cathode and the anode prepared above to obtain an electrode assembly. The electrode assembly was inserted in a pouch-type battery case, in which a non-aqueous electrolyte solution (1M LiPF$_6$, EC:EMC=3:7 (vol/vol), followed by complete sealing, to prepare a lithium secondary battery.

2.. EXAMPLE 2

The procedures of Example 1 were repeated except that the amount of lithium was 10 wt % based on the total weight of the anode in the preparation of an anode, to prepare a lithium secondary battery.

3.. EXAMPLE 3

The procedures of Example 1 were repeated except that the amount of lithium was 20 wt % based on the total weight of the anode in the preparation of an anode, to prepare a lithium secondary battery.

4.. EXAMPLE 4

The procedures of Example 1 were repeated except that the amount of lithium was 30 wt % based on the total weight of the anode in the preparation of an anode, to prepare a lithium secondary battery.

5.. EXAMPLE 5

The procedures of Example 1 were repeated except that the amount of lithium was 50 wt % based on the total weight of the anode in the preparation of an anode, to prepare a lithium secondary battery.

6.. COMPARATIVE EXAMPLE 1

The procedures of Example 1 were repeated except that the amount of lithium was 60 wt % based on the total weight of the anode in the preparation of an anode, to prepare a lithium secondary battery.

7.. COMPARATIVE EXAMPLE 2

The procedures of Example 1 were repeated except that the amount of lithium was 70 wt % based on the total weight of the anode in the preparation of an anode, to prepare a lithium secondary battery.

8.. COMPARATIVE EXAMPLE 3

The procedures of Example 1 were repeated except that a general copper foil as current collector was used, instead of the copper foam form, on which a lithium foil was laminated, to prepare a lithium secondary battery.

9.. EVALUATION OF LITHIUM SECONDARY BATTERY FOR SHORT CIRCUIT

The lithium secondary batteries prepared in the Examples and the Comparative Examples were evaluated for the time that a short circuit occurs. For this, the batteries were repeatedly subject to charge with a current density of 0.1 C and discharge with a current density of 0.1 C. The results thereof are shown in Table 1.

TABLE 1

| | Occurrence of short Circuit (Cycle) |
|---|---|
| Example 1 | 190 |
| Example 2 | >400 |
| Example 3 | 320 |
| Example 4 | 250 |
| Example 5 | 200 |
| Com. Example 1 | 130 |
| Com. Example 2 | 130 |
| Com. Example 3 | 130 |

As shown in Table 1, the time that a short circuit occurs was shorter in the batteries of the Comparative Examples than those of the Examples. That is, since the batteries of the Examples comprise a lithium electrode having a porous metallic current collector, they have been confirmed to prevent the growth of lithium dendrites, thereby reducing the short circuit of the batteries. Meanwhile, in Comparative Examples 1 and 2 in which the amount of lithium exceeds 50 wt %, short circuits occurred at the same cycle as Comparative Example 3 having no porous metallic current collector. From these results, excessive amounts of lithium covered the whole pores of the porous metallic current collector, making it difficult to obtain an effect derivable from the use of the porous metallic current collector.

The foregoing disclosure is given by way of illustration only, and various changes and modifications within the spirit and scope of the disclosure will become apparent to those skilled in the art from this detailed description. Accordingly, it should be understood that the Examples of the present disclosure are provided for the purpose of illustrations only and to better explain to a person having ordinary skill in the art, and is not intended to limit the scope of the present disclosure. The scope of the present to be protected should be defined by the claims, all technical spirits equivalent thereto should be interpreted to be fallen within the scope of the present disclosure.

What is claimed is:

1. A lithium electrode, comprising:
a porous metallic current collector; and
lithium metal inserted into pores present in the metallic current collector, wherein the lithium metal is inserted in an amount of 1 to 50 wt % based on the total weight of the lithium electrode.

2. The lithium electrode of claim 1, wherein the metallic current collector is made of any one selected from the group consisting of copper, nickel, iron, chromium, zinc, stainless steel and a mixture thereof.

3. The lithium electrode of claim 1, wherein the metallic current collector has a porosity of 50 to 99%.

4. The lithium electrode of claim 1, wherein the pores have a size of 5 to 500 μm.

5. The lithium electrode of claim 1, wherein the metallic current collector is in the form of metal mesh or metal foam.

6. A lithium secondary battery, comprising:
an electrode assembly comprising a cathode, an anode, and a separator interposed therebetween;
a battery case for receiving the electrode assembly; and
a non-aqueous electrolyte solution being introduced in the battery case to be impregnated into the electrode assembly,
wherein the anode is the lithium electrode of claim 1.

7. The lithium secondary battery of claim 6, wherein the cathode comprises a cathode active material selected from the group consisting of $LiCoO_2$, $LiNiO_2$, $LiMn_2O_4$, $LiCoPO_4$, $LiFePO_4$, $LiNiMnCoO_2$, $LiNi_{1-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

8. The lithium secondary battery of claim 6, wherein the separator is a porous substrate made of any one selected from the group consisting of polyethylene, polypropylene, polybutylene, polypentene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate and a mixture thereof.

9. The lithium secondary battery of claim 6, wherein the non-aqueous electrolyte solution comprises an organic solvent and an electrolyte salt.

10. The lithium secondary battery of claim 9, wherein the organic solvent is any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, fluoroethylene carbonate (FEC), dimethyl carbonate (DMC), diethyl carbonate (DEC), dipropyl carbonate, ethyl methyl carbonate (EMC), ethyl propyl carbonate, ethyl propyl carbonate, dimethyl ether, diethyl ether, dipropyl ether, methyl ethyl ether, methyl propyl ether, ethyl propyl ether, methyl acetate, ethyl acetate, propyl acetate, methyl propionate, ethyl propionate, propyl propionate, γ-butyrolactone, γ-valerolactone, γ-caprolactone, σ-valerolactone, ϵ-caprolactone and a mixture thereof.

11. The lithium secondary battery of claim 9, wherein the electrolyte salt comprises an anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

12. The lithium secondary battery of claim 6, wherein the battery case is cylindrical, prismatic, pouch, or coin forms.

* * * * *